(12) United States Patent
Spalink et al.

(10) Patent No.: US 11,532,869 B2
(45) Date of Patent: Dec. 20, 2022

(54) RADAR ANTENNA ARRAY FOR THREE-DIMENSIONAL IMAGING

(71) Applicant: Sony Corporation, Tokyo (JP)

(72) Inventors: Gerd Spalink, Stuttgart (DE); Ramona Hotopan, Stuttgart (DE)

(73) Assignee: Sony Corporation, Tokyo (JP)

( * ) Notice: Subject to any disclaimer, the term of this patent is extended or adjusted under 35 U.S.C. 154(b) by 495 days.

(21) Appl. No.: 16/608,196

(22) PCT Filed: Apr. 23, 2018

(86) PCT No.: PCT/EP2018/060360
§ 371 (c)(1),
(2) Date: Oct. 25, 2019

(87) PCT Pub. No.: WO2018/197422
PCT Pub. Date: Nov. 1, 2018

(65) Prior Publication Data
US 2021/0111479 A1 Apr. 15, 2021

(30) Foreign Application Priority Data
Apr. 27, 2017 (EP) .................... 17168336

(51) Int. Cl.
*H01Q 1/24* (2006.01)
*G01S 7/03* (2006.01)
(Continued)

(52) U.S. Cl.
CPC .............. *H01Q 1/24* (2013.01); *G01S 7/032* (2013.01); *G01S 13/003* (2013.01); *G01S 13/89* (2013.01);
(Continued)

(58) Field of Classification Search
CPC ...... H01Q 21/28; H01Q 21/08; H01Q 21/065; H01Q 21/005; G01S 7/032; G01S 13/003
See application file for complete search history.

(56) References Cited

U.S. PATENT DOCUMENTS 6,667,724 B2 12/2003 Barnes et al.
10,197,671 B2 * 2/2019 Alland .................. H01Q 21/08
(Continued)

FOREIGN PATENT DOCUMENTS

CN 102169170 A 8/2011
CN 102521472 A 6/2012
(Continued)

OTHER PUBLICATIONS

E. Miralles et al., "Low cost multipurpose RF system approach: Integration of a MIMO radar and a communications frontend on a single PCB," 2016 European Radar Conference (EuRAD), 2016, pp. 137-140. (Year: 2016).*
(Continued)

*Primary Examiner* — Bernarr E Gregory
(74) *Attorney, Agent, or Firm* — Xsensus LLP

(57) ABSTRACT

Radar device comprising a transmit antenna array comprising a plurality of transmit antennas each having a phase center; and a receive antenna array comprising a plurality of receive antennas each having a phase center, the transmit antennas being arranged such that their phase centers lie on a first straight line, and the receive antennas being arranged such that their phase centers lie on a second straight line; wherein the transmit antenna array and the receive antenna array are positioned relative to each other such that the first straight line and the second straight line extend in an oblique angle relative to each other.

20 Claims, 5 Drawing Sheets

(51) Int. Cl.
  *G01S 13/00* (2006.01)
  *G01S 13/89* (2006.01)
  *H01Q 1/32* (2006.01)
  *H01Q 21/00* (2006.01)
  *H01Q 21/06* (2006.01)
  *H01Q 21/08* (2006.01)
  *H01Q 21/28* (2006.01)
  *G01S 13/931* (2020.01)

(52) U.S. Cl.
  CPC ......... *H01Q 1/3233* (2013.01); *H01Q 21/005* (2013.01); *H01Q 21/065* (2013.01); *H01Q 21/08* (2013.01); *H01Q 21/28* (2013.01); *G01S 13/931* (2013.01)

(56) References Cited

U.S. PATENT DOCUMENTS

| | | | |
|---|---|---|---|
| 10,371,796 B2* | 8/2019 | Kishigami | ........... H01Q 21/061 |
| 10,677,918 B2* | 6/2020 | Ding | ..................... H01Q 21/061 |
| 2002/0145570 A1 | 10/2002 | Barnes et al. | |
| 2014/0062762 A1 | 3/2014 | Kurono et al. | |
| 2015/0253419 A1 | 9/2015 | Alland | |

FOREIGN PATENT DOCUMENTS

| | | |
|---|---|---|
| CN | 105223554 A | 1/2016 |
| CN | 105428822 A | 3/2016 |
| JP | 2003-344535 A | 12/2003 |
| WO | 2016/045938 A1 | 3/2016 |

OTHER PUBLICATIONS

International Search Report and Written Opinion dated Jun. 20, 2018 for PCT/EP2018/060360 filed on Apr. 23, 2018, 12 pages.

Feger, R., et al., "A 77-GHz FMCW MIMO Radar Based on an SiGe Single-Chip Transceiver," IEEE Transactions on Microwave Theory and Techniques, vol. 57, No. 5, May 2009, IEEE, Apr. 14, 2009, pp. 1020-1035.

Shakeri, S., "Direction of arrival estimation using sparse ruler array design," 2012 IEEE 13th International Workshop on Signal Processing Advances in Wireless Communications (SPAWC), IEEE, Jun. 17, 2012, pp. 525-529.

Chong, C. Y., et al., "Hybrid MIMO Radar: Configurations and Application on STAP," May 2010, 7 pages.

Wikipedia, "Golomb Ruler," Retrieved from URL: https://en.wikipedia.org/wiki/Golomb_ruler on Feb. 14, 2017, 7 pages.

* cited by examiner

7x13 extended array from 3+4 antenna arrangement

RADAR ANTENNA ARRAY FOR THREE-DIMENSIONAL IMAGING

CROSS-REFERENCE TO RELATED APPLICATIONS

The present application is based on PCT filing PCT/EP2018/060360, filed Apr. 23, 2018, and claims priority to EP 17168336.0, filed Apr. 27, 2017, the entire contents of each are incorporated herein by reference.

BACKGROUND

Field of the Disclosure

The present disclosure relates to radar devices for three-dimensional imaging. In particular, it relates to radar devices comprising a radar antenna array for determining elevation and azimuth angles of a target object.

Description of Related Art

In many application fields, radar devices are increasingly used for detecting objects. For example, radar devices are very common in modern vehicles as a main part for electronic assistance systems supporting the driver driving the vehicle. For example, radar devices are used to detect vehicles or other objects in front of the vehicle as to decelerate or accelerate the vehicle. For a reliable operation of such systems a three-dimensional imaging of the field in front of the vehicle is essential. Therefore, these systems determine not only the distance to the objects but also the azimuth angle and the elevation angle. Only this information allows to differentiate between relevant and irrelevant objects.

Present radar devices use the so-called MIMO principle (multiple input and multiple output) using multiple transmit and receive antennas as to multiply the capacity. A MIMO radar device uses for example N transmit antennas and M receive antennas. Using these N+M antennas it is possible to build a virtual array with N×M antennas where the virtual antenna phase center positions are located at the sum of the respective transmit and receive phase center positions. In order to reduce the number of antennas, minimum redundancy arrays are a known solution. In such minimum redundancy arrays, the antenna positions are the same as the marks found on a so-called Golomb ruler. A Golomb ruler is a set of marks at integer positions along an imaginary ruler such that no two pairs of marks are the same distance apart.

A MIMO radar device is for example disclosed in WO 2016/045938 A1.

Present solutions for creating three dimensional images using uniform rectangular arrays need a very large number of antennas for good imaging results.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object to provide a radar device proving good three-dimensional imaging with a reduced number of antennas.

According to an aspect there is provided a radar device comprising a transmit antenna array comprising a plurality of transmit antennas each having a phase center, and a receive antenna array comprising a plurality of receive antennas each having a phase center, the transmit antennas being arranged such that their phase centers lie on a first straight line, and the receive antennas being arranged such that their phase centers lie on a second straight line, wherein the transmit antenna array and the receive antenna array are positioned relative to each other such that the first straight line and the second straight line extend in an oblique angle relative to each other.

That means in other words that the first straight line and the second straight line are nonparallel.

Further it is to be noted that "phase center" defines a reference point of an antenna which is deemed to be the radiation source regarded from a remote location.

Further it is to be noted that the antenna arrays are operated according to the MIMO principles, hence forming a MIMO radar device.

In a preferred embodiment, the transmit antenna array and/or the receive antenna array are provided as minimum-redundancy antenna arrays.

This means in other words that the transmit/receive antennas are placed on the marks of a Golomb ruler so that no two pairs of antennas of an array are the same distance apart.

In a preferred embodiment, the transmit antennas and the receive antennas are arranged in one plane defined by a first axis and a second axis being perpendicular to the first axis.

In a preferred embodiment, the oblique angle is about 90°.

In a preferred embodiment, said antennas are provided as patch antennas or series fed patch antenna arrays.

In a preferred embodiment, the antennas of the transmit antenna array and/or the receive antenna array are provided as substrate integrated wave guide (SIW) slot antennas or comb-line antennas.

Here it is to be noted that the receive antennas should match with each other and the transmit antennas should match with the other transmit antennas. However, it is not necessary to use the same antenna type for the transmit antenna array and the receive antenna array. For example SIW slot antennas and comb-line antennas may be combined as transmit and receive antennas.

In a preferred embodiment, each antenna of the transmit antenna array and the receive antenna array comprises a plurality of antenna elements being arranged such that the phase center of the plurality of antenna elements lies on the first straight line and the second straight line, respectively. Preferably, said antenna elements of an antenna are arranged spaced apart in a given raster and on a straight line which is parallel to an axis having the same angle with a first straight line and the second straight line.

This means in other words that each antenna of an antenna array is replaced by a plurality of antenna elements wherein the phase center of the plurality of antenna elements is identical to the phase center of the antenna to be replaced. The antenna elements of an antenna are positioned on a straight line and spaced according to a predetermined raster wherein the straight line is parallel to a straight line passing the point of intersection of the first and second straight lines and having the same angle with the first straight line and the second straight line. That means in other words that this straight line is the bisecting line of the oblique angle.

In a preferred embodiment said antenna elements of an antenna are arranged spaced apart in a given raster and on two parallel straight lines which are parallel to an axis having the same angle with the first straight line and the second straight line.

This means in other words that an antenna is replaced by a plurality of antenna elements arranged on two parallel straight lines which are also parallel to the bisecting line of the oblique angle. However, the phase center of this antenna element arrangement is still identical to the phase center of the antenna to be replaced.

It is to be noted here that the antenna element arrangement may also be provided as an arrangement having antenna elements arranged on three or more straight lines.

In a preferred embodiment passive antenna elements, dummy elements, are provided between at least two adjacent antennas or adjacent to at least one antenna.

This means in other words that antenna elements are provided which do not actively radiate but only parasitically. These dummy antennas are connected to ground or open circuit. Such dummy antennas are provided between adjacent antennas of the antenna array or at an edge of the array.

The dummy elements may be used for beam shaping so that it is possible to provide an antenna having a more focused beam and an increased gain.

In a preferred embodiment, a radar signal processing unit is provided adapted to receive the signals from the receive antenna array and to determine an azimuth and elevation image. More preferably, said radar signal processing unit is adapted to activate the transmit antenna array as to transmit signals wherein the activation is matched to the signal processing of the received signals. Further, said radar signal processing unit is adapted to activate the transmit antenna array such that signals are transmitted sequentially or jointly.

In a preferred embodiment said transmit antenna array comprises a first number of one to four transmit antennas and said receive antenna array comprises a second number of one to four receive antennas.

More preferably, said transmit antenna array comprises three transmit antennas and said receive antenna array comprises four receive antennas. In this embodiment, the radar device comprises seven antennas in total allowing to achieve imaging capability similar to 91 antennas, for example (the corresponding extended array using three transmit antennas and four receive antennas has the size of seven by thirteen antennas).

Preferred embodiments are defined in the dependent claims.

One of the aspects of the present disclosure is to replace a known uniform rectangular array of transmit/receive antennas by an arrangement having a first number of transmit antennas positioned with their phase centers on a first straight line and a second number of receive antennas with their phase centers positioned on a second straight line, wherein both straight lines are not parallel. This array achieves good imaging capability with a very small number of antennas.

The radar device of the present disclosure is useful in a variety of different technical fields, for example in automotive applications as part of electronic driver assistance systems or in surveillance applications or in the field of gesture sensing/recognition as to mention just a few.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
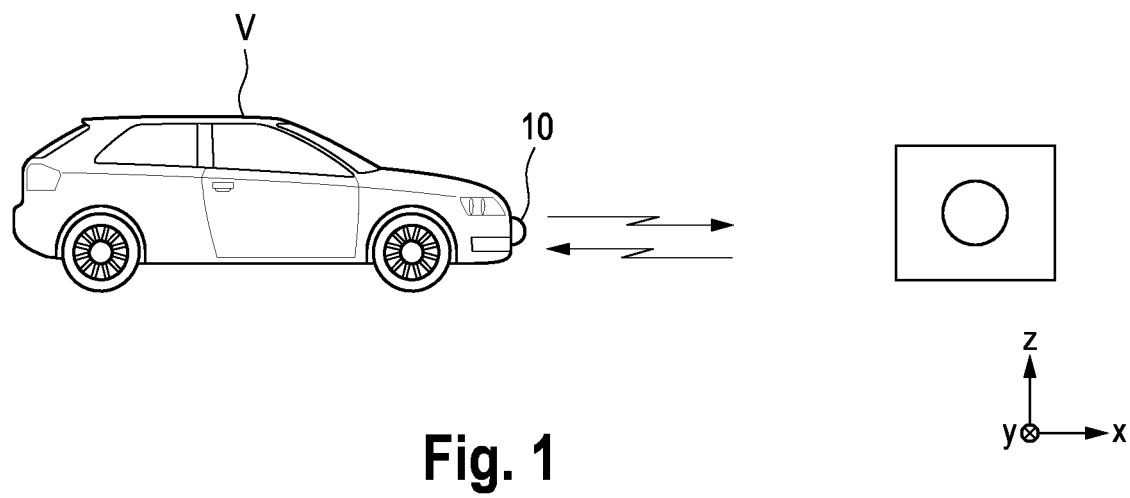
FIG. 1 shows a schematic diagram of an illustrative application of a radar device.

Referring now to the drawings, wherein like reference numerals designate identical or corresponding parts throughout the several views, FIG. 1 shows a particular application of a radar device which will be described in detail below. A radar device designated with reference numeral 10 may be mounted at the front of a vehicle V in order to scan the front region of the vehicle V. In particular, the radar device 10 is used to detect an object O in front the vehicle V. In addition to the distance between the vehicle V and the object O, the radar device also provides an azimuth angle and an elevation angle of the object relative to the radar device 10. The azimuth angle defines the position of the object in the X-Y plane (see diagram in FIG. 1), or in other words whether the object O lies directly in front of the radar device or on the left or right side thereof. The elevation angle defines the position of the object relative to the radar device 10 in height (Z direction), i.e. whether the object is above or below the radar device 10.

The result of a radar scan by the radar device 10 is a three-dimensional image of the front field of the vehicle which allows to determine objects. The detection of objects may then be used for example in an electronic vehicle assistance system to operate the brakes of the vehicle as to avoid a collision with the object O.

In order to differentiate between relevant objects, for example a further vehicle in front, or non-relevant objects, like a street light at the roadside, the radar device should have good imaging capability with a focused beam and improved gain. For the mentioned application, the radar device should have a wide illumination/viewing angle in azimuth direction and a narrow illumination/viewing angle in elevation direction.

These properties are achievable with a radar device having less antennas compared to known solutions as described in detail below.

Figure 2:
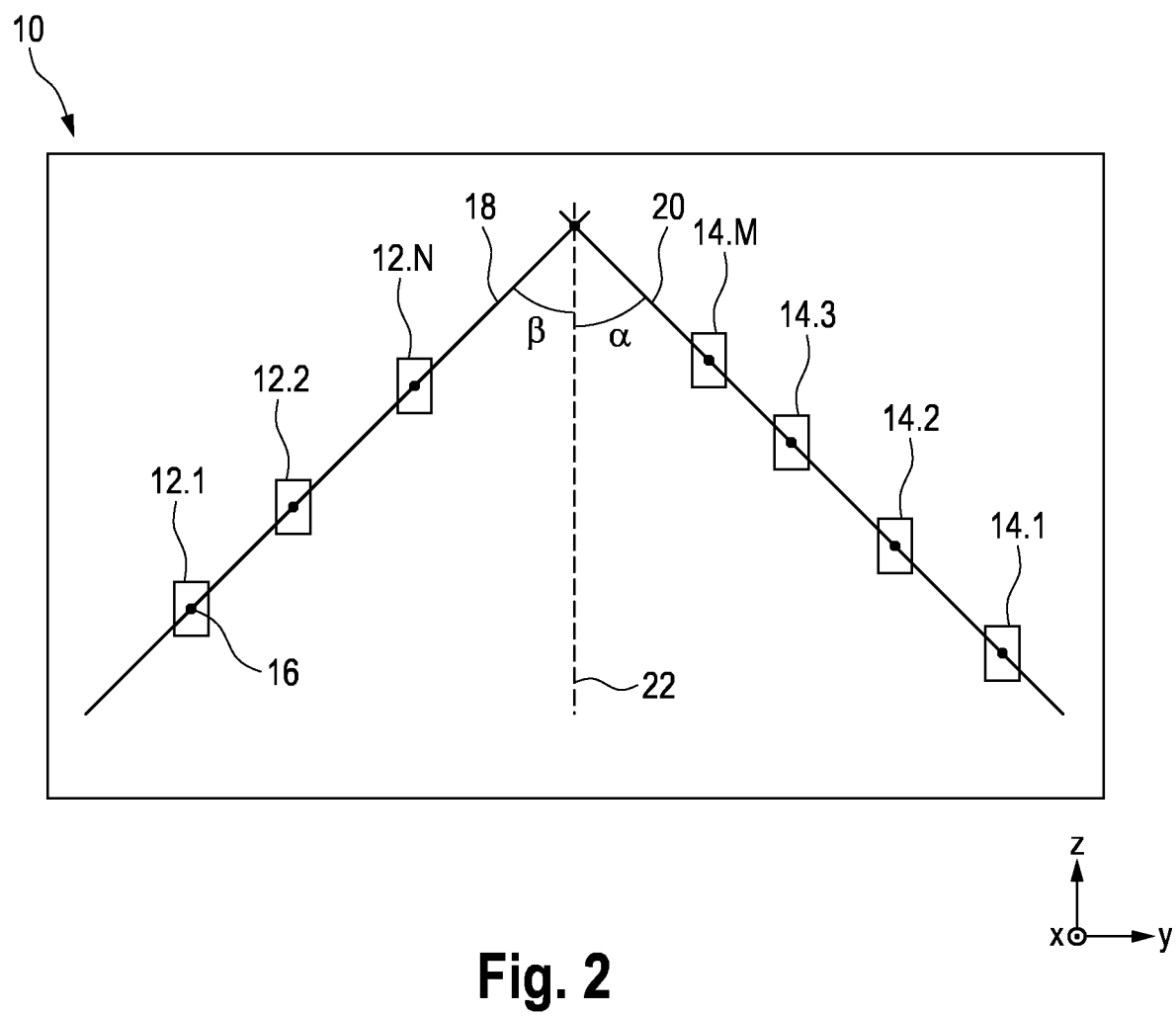
FIG. 2 shows a schematic diagram of a radar device according to the present invention.

FIG. 2 shows in a schematic diagram the general structure of a radar device 10, in particular the arrangement of the antennas.

The radar device 10 shown in FIG. 2 comprises a number N transmit antennas 12.1 to 12.N and a number M of receive antennas 14.1 to 14.M. Each of the antennas 12, 14 has a phase center which is indicated as a point 16. All antennas 12, 14 are positioned in the same plane, here the Y-Z plane. Hence, the direction of signal transmission is perpendicular to this plane, namely in X-direction.

The transmit antennas 12 are arranged such that their phase centers 16 lie on a straight line 18. The receive antennas 14 are arranged such that their phase centers lie on a second straight line 20 which is different to the first straight line 18. In particular, both straight lines 18, 20 inclose an angle of preferably 90°. In general, the inclosed angle is an oblique angle meaning that both straight lines are not parallel to each other, i.e., an oblique angle shall be understood as any angle different from 0°.

For explanation purposes, a further auxiliary line 22 is shown in FIG. 2 bisecting the inclosed angle in a first angle α and a second angle β both having the same value, preferably 45°.

The transmit antennas 12 and the receive antennas 14 may be positioned on the straight lines with equal distances therebetween, for example. It would also be possible to position the antennas in a predetermined grid/raster. However, it is preferred to position the transmit antennas and the receive antennas on the respective lines 18, 20 according to a Golomb-ruler arrangement.

A Golomb ruler is a set of marks at integer positions along an imaginary ruler such that no two pairs of marks are the same distance apart.

For the antenna arrangement, this means that the transmit antennas 12 are positioned such that no two pairs of antennas are the same distance apart. Also, the receive antennas are positioned such that no two pairs of receive antennas are the same distance apart.

Figure 3:
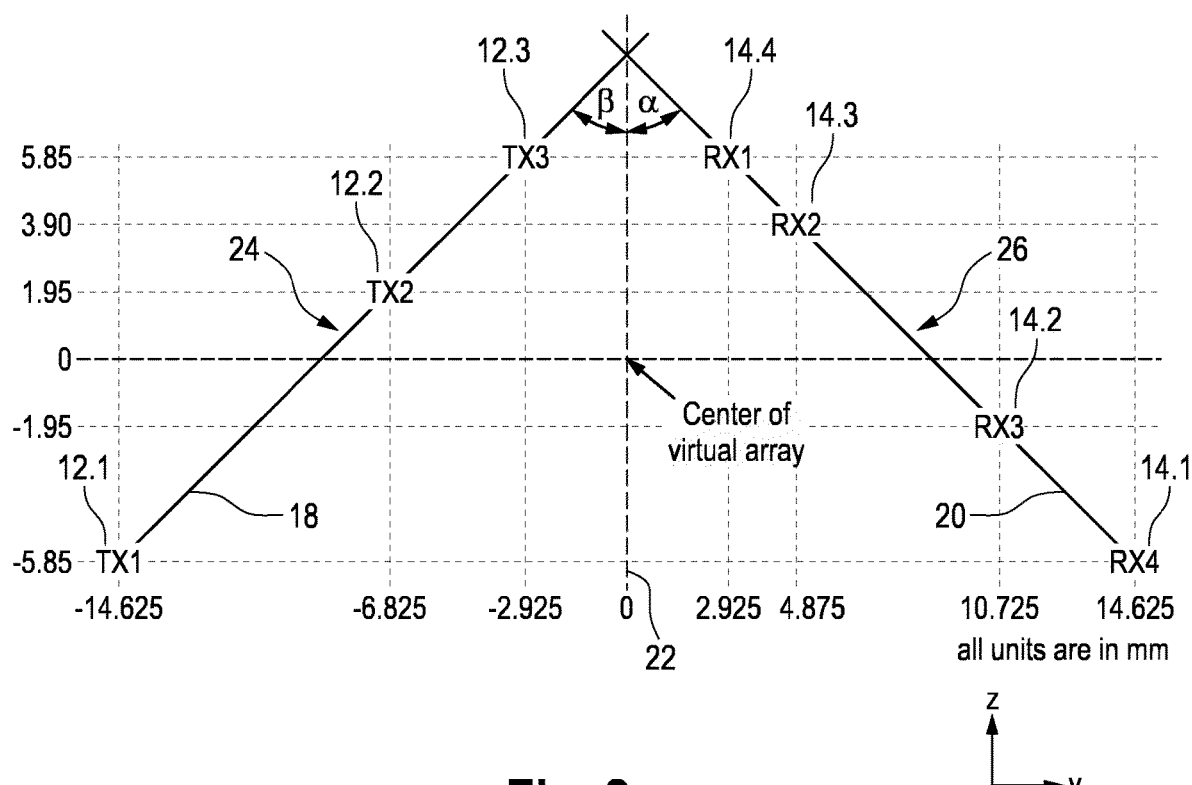
FIG. 3 shows a diagram showing the positions of the antennas of a transmitter array and a receiver array.

In FIG. 3 an example of the arrangement of transmit antennas and receive antennas is shown with three transmit antennas 12.1 to 12.3 and four receive antennas 14.1 to 14.4 and two angles α=45° and β=45°. This results in a receive antenna base unit of 0.5 times the wavelength in both y-direction and z-direction. For the transmit antenna, this results in a base unit of 1 times the wavelength in both y-direction and z-direction.

This arrangement of the transmit antennas and receive antennas following the Golomb rulers forms so-called minimum redundancy transmit antenna array and receive antenna array, indicated by reference numeral 24 and 26 respectively.

In the shown embodiment, the first transmit antenna 12.1 is positioned at coordinates −14.625/−5.85 (Y-Z plane), the second transmit antenna 12.2 at coordinates −6.825/1.95 and the third transmit antenna 12.3 at coordinates −2.925/5.85. The first receive antenna 14.1 is positioned at coordinates 14.625/−5.85, the second receive antenna 14.2 at coordinates 10.725/−1.95, the third receive antenna 14.3 at coordinates 4.875/3.9 and the fourth receive antenna 14.4 at coordinates 2.925/5.85. This antenna arrangement is particularly advantageous for millimetre wave operating frequencies around 77 GHz.

When operating this radar device using MIMO (multiple input multiple output) principles it is possible to achieve the imaging capability of a corresponding extended antenna array of the size of seven by thirteen antennas, hence 91 antennas. With the center of the extended antenna array being shown at coordinates 0/0.

Figure 4:
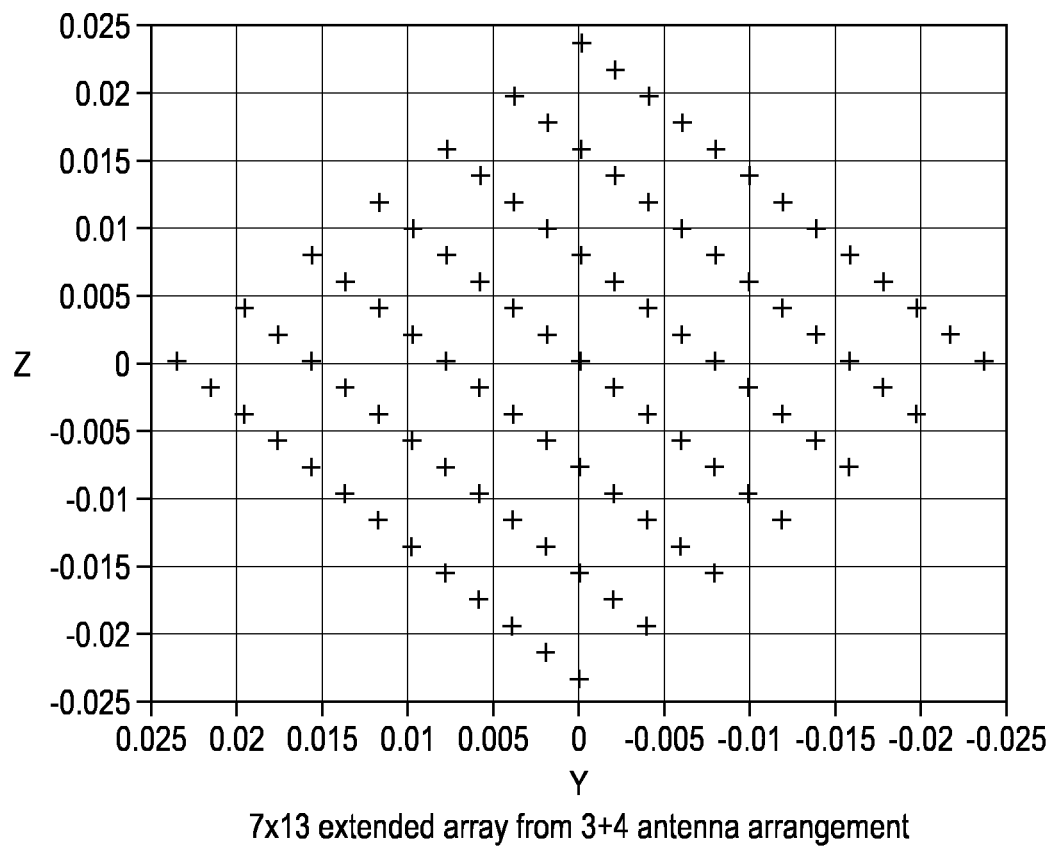
FIG. 4 shows a diagram illustrating the virtual antenna array resulting from the antenna device shown in FIG. 2.

As it is known in the art the receive signals of a MIMO radar device for example shown in FIG. 3, and their complex conjugates are combined by a Kronecher product to create receive signals of a virtual uniform rectangular array. In general, the number of antenna elements will correspond to the order of the Golomb ruler and the resulting rectangular array size will depend on the length of the ruler. During signal processing, the respective processor transforms the physical sparse MIMO array, as shown in FIG. 3, into an extended fully populated array. In a first step, all transmit phase center positions and all receiver phase center positions are added. The resulting virtual array can be extended by subtracting each virtual position from any other virtual position. The extended array for the physical sparse MIMO array as shown in FIG. 3 is illustrated in FIG. 4. The subtract operation in the array synthesis part and the conjugate operation in the signal processing part correspond to each other.

As shown in FIG. 4 the extended array comprises 91 (=7×13) antennas.

The transmit antennas 12 and the receive antennas 14 may be implemented as patch antennas mounted on a flat surface of a circuit board, for example wherein the processer for signal processing is also provided on the circuit board.

Figures 6A, 6B:
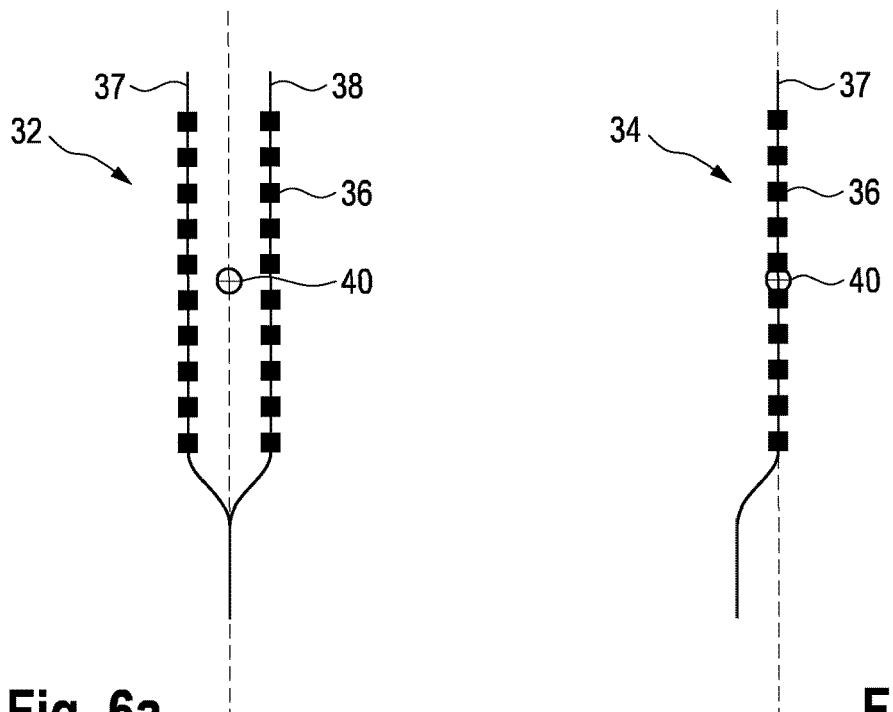
FIG. 6A, B show a transmit antenna and a receive antenna used in the radar device of FIG. 5.

In a preferred embodiment, each antenna 12, 14 may be replaced with an antenna arrangement comprising several antenna elements as illustrated in FIG. 6A and FIG. 6B.

For example, a transmit antenna, for example transmit antenna 12.1, may be replaced by an antenna arrangement 32 comprising a plurality of antenna elements 36 arranged symmetrically on two straight lines 37, 38. In this embodiment, there are ten-antenna elements 36 arranged on the first straight line 37 and ten antenna elements 36 arranged on the second straight line 38, wherein the antenna elements 36 are positioned relative to each other on a respective straight line 37, 38 according to a predetermined raster, for example equally spaced. The phase center of this antenna arrangement 32 is indicated by reference numeral 40. The phase center 40 lies on a line which is parallel to both straight lines 37, 38.

The antenna arrangement 34 replacing a receive antenna comprises ten antenna elements 36 on a single straight line 37. The phase center of this antenna arrangement 34 is also indicated with reference numeral 40 and lies on the straight line 37.

Figure 5:
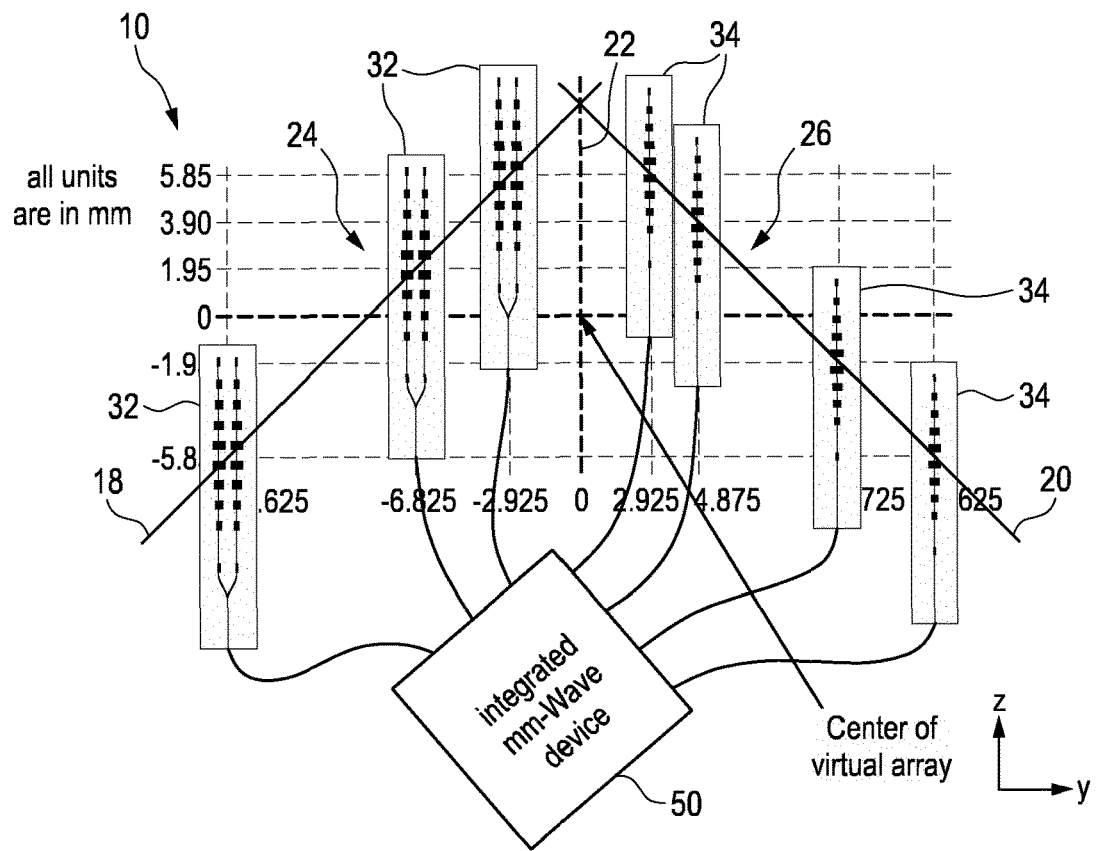
FIG. 5 shows a schematic diagram of a radar device according to a further embodiment.

A radar device 10 using the antenna arrangements 32, 34 for the transmit antennas 12 and the receive antennas 14, respectively, is shown in FIG. 5.

It is apparent from this FIG. 5 that the antenna arrangements 32 are positioned on the first straight line 18 such that the phase centers 40 lie on the same positions as the phase centers 16 of the respective transmit antennas 12.1 to 12.3.

Further, the antenna arrangements 34 are positioned on the second straight line 20 such that the phase centers 40 lie on the same positions as the respective receive antennas 14.1 to 14.4.

Further, the antenna arrangements 32 are oriented such that the straight lines 37, 38 are parallel to the auxiliary line 22. Hence, the antenna arrangement 32 extends in a vertical direction, namely in Z-direction.

In the same way, the antenna arrangements 34 are oriented such that the straight line 37 is parallel to the auxiliary line 22. Hence, the antenna arrangement 34 extends in the vertical direction, namely the Z-direction.

The antenna arrangements 32, 34 may be provided as planar serial fed antenna arrays with different gain values and different viewing angles, for example. Likewise, SIW (substrate integrated wave guide) slot antennas or comb-line antennas could be used.

As also shown in FIG. 5, the radar device comprises an integrated millimetre wave device 50 comprising the signal processing circuit and other components necessary to feed the antenna elements and to receive and process the receiving signals from the receiving antennas.

In order to have very short feed lines for the antennas, the device 50 is fitted diagonally on the printed circuit board also comprising the antennas.

This particular structure/arrangement of the antennas allows to implement the single antennas 12, 14 as large in vertical direction and small in horizontal direction. This is of particular advantage when using the radar device 10 in a vehicle for short range or medium range object/target detection. The radar device shown in FIG. 5 provides a wide illumination/viewing angle in horizontal or azimuth direction and a narrow illumination/viewing angle in a vertical or elevation direction.

Figure 7:
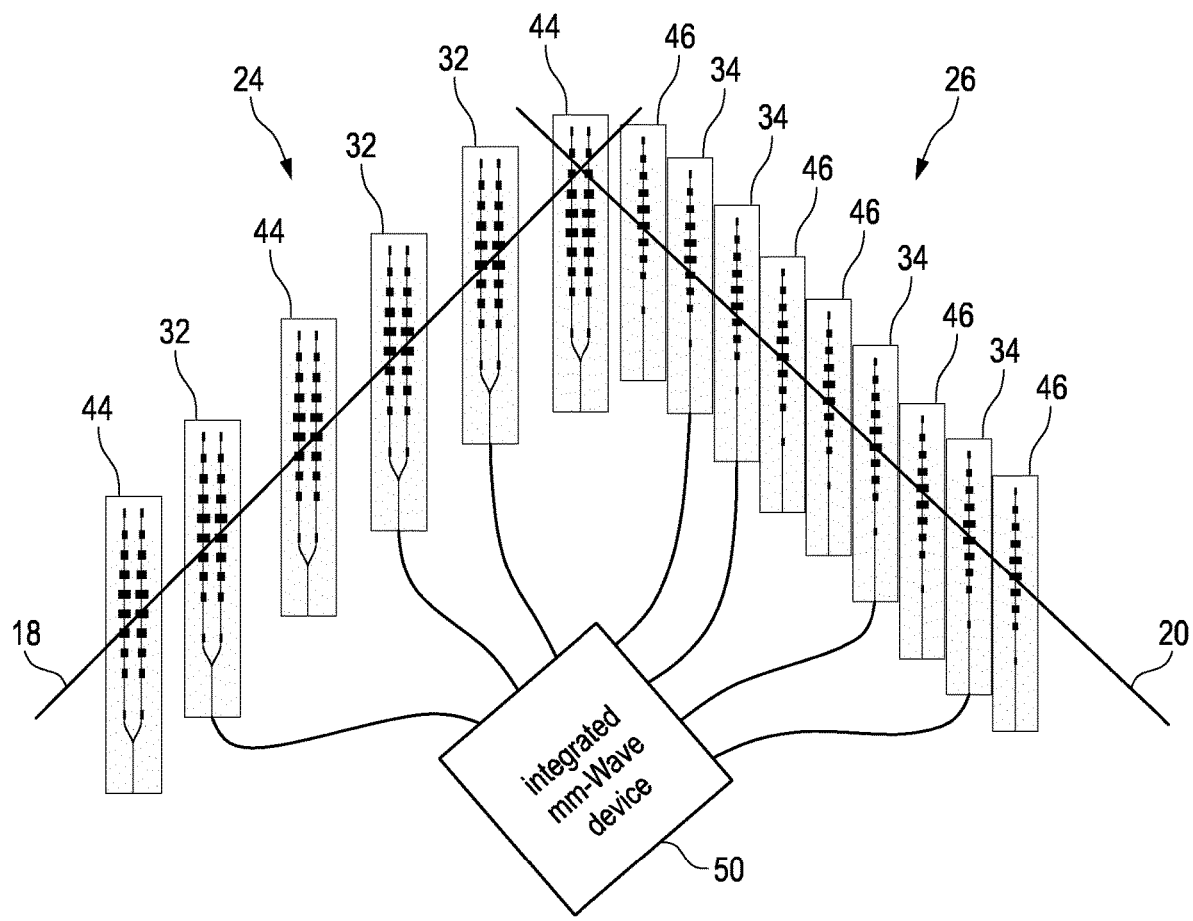
FIG. 7 shows a radar device according to a further embodiment using dummy antennas.

As to achieve a better matching between the antennas 36 of the transmit antenna array 24 and the receive antenna array 26 and also to shape the beam, unused array positions can be populated with passive antennas, also called dummy antennas, indicated in FIG. 7 by reference numerals 44 and 46. The difference between the antennas 12, 14, 32, 34 and the dummy antennas 44, 46 is that the dummy antennas are passive elements not being fed by the device 50 and terminated by open ended/shorted to ground. Hence, the dummy antennas may radiate only parasitically as to finally make homogeneous/uniform total pattern in combination with the other (active) antennas 32, 34.

As shown in the embodiment of FIG. 7, the transmit antenna array 24 comprises three dummy antennas 44, one of the dummy antennas 44 being arranged at the edge of the array 24, one in the middle between two adjacent antenna arrangements 32 and one dummy element at the other edge of the transmit antenna array 24 (near to the intersection point of the straight lines 18, 20).

The receive antenna array 26 comprises five dummy elements 46, two of them being positioned at the edges of the array 26, further two dummy elements 46 between adjacent antenna arrangements 34 and one dummy element 46 between other adjacent antenna arrangements 34. The dummy antennas 44, 46 may have exactly the same form factor as the respective active antenna arrangements 32 and 34, respectively. In other words, the dummy elements 44 may be designed similar to the antenna arrangement shown in FIG. 6A and the dummy elements 46 may be designed as shown in FIG. 6B.

It is also to be mentioned that the phase center of the dummy elements should also lie on the straight line 18 and straight line 20, respectively.

It may be necessary to move the active transmit and receive antennas so that they are further apart. As long as the relative positions between the transmit antennas and the relative positions between the receive antennas are kept, the operation as a MIMO antenna array is not affected. By setting the proper distance of the dummy antennas to the active antennas, the radar device has a more focused beam and an increased gain.

With the several radar device embodiments described above, single targets may be detected with the same sharpness as if a full array would have been used.

Hence, the radar device according to the present invention only having a small number of physical antennas achieves good detection in three dimensions range, azimuth angle and elevation angle. This results in a small and low-cost millimetre wave front end in radar applications.

Obviously, numerous modifications and variations of the present disclosure are possible in the light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

Any reference signs in the claims should not be construed as limiting the scope.

The invention claimed is:

1. A radar device comprising:
a transmit antenna array comprising a plurality of transmit antennas each having a phase center, the plurality of transmit antennas being more than two; and
a receive antenna array comprising a plurality of receive antennas each having a phase center, the plurality of receive antennas being more than two,
wherein the transmit antennas are arranged such that their phase centers lie on a first straight line,
wherein the receive antennas are arranged such that their phase centers lie on a second straight line,
wherein the transmit antenna array and the receive antenna array are positioned relative to each other such that the first straight line and the second straight line extend in a non-zero, non-parallel angle relative to each other,
wherein all of the transmit antennas are on a first side of a center line of a virtual array of the radar device,
wherein all of the receive antennas are on a second side of the center line of the virtual array of the of the radar device, and
wherein the center line of the virtual array bisects the non-zero, non-parallel angle.

2. The radar device according to claim 1, wherein the transmit antenna array and/or the receive antenna array are provided as minimum-redundancy antenna arrays.

3. The radar device according to claim 1, wherein the transmit antennas and the receive antennas are arranged in one plane (y-z plane) defined by a first axis (y-axis) and a second axis (z-axis) being perpendicular to the first axis.

4. The radar device according to claim 1, wherein the non-zero, non-parallel angle is 90°.

5. The radar device according to claim 1, wherein said transmit and/or said receive antennas are one of: patch antennas or a series fed patch antenna array.

6. The radar device according to claim 1, wherein the transmit antennas of the transmit antenna array and/or the receive antennas of the receive antenna array are provided as substrate integrated wave-guide (SIW) slot antennas or comb-line antennas.

7. The radar device according to claim 1, wherein each said transmit antenna of the transmit antenna array and/or each said receive antenna of the receive antenna array comprises a plurality of antenna elements arranged such that the phase centers of each of the plurality of antenna elements lies on the first straight line and the second straight line, respectively.

8. The radar device according to claim 7, wherein said antenna elements per antenna are arranged spaced apart in a given raster and on a straight line which is parallel to the center line of the virtual array.

9. The radar device according to claim 7, wherein said antenna elements per antenna are arranged spaced apart in a given raster and on two parallel straight lines which are parallel to the center line of the virtual array.

10. The radar device according to claim 7, wherein non-terminated antenna elements, dummy elements, are provided between at least two adjacent antennas or adjacent to at least one antenna.

11. The radar device according to claim 10, wherein said dummy elements are configured for beam shaping.

12. The radar device according to claim 1, further comprising a radar signal processor configured to receive signals from the receive antenna array and to determine an azimuth and elevation image.

13. The radar device according to claim 12, wherein said radar signal processor is configured to activate the transmit antenna array as to transmit signals, wherein the activation is matched to the signal processing of the received signals.

14. The radar device according to claim 13, wherein said radar signal processor is configured to activate the transmit antenna array such that the signals are transmitted sequentially or jointly.

15. The radar device according to claim 1,
wherein no two pairs of the transmit antennas are a same distance apart along the first straight line, and/or
wherein no two pairs of the receive antennas are a same distance apart along the first straight line.

16. The radar device according to claim 1, further comprising a dummy antenna at an intersection of the first straight line and the second straight line.

17. A radar system comprising:
a transmit antenna array including a plurality of transmit antennas each having a phase center, the plurality of transmit antennas being more than two; and
a receive antenna array including a plurality of receive antennas each having a phase center, the plurality of receive antennas being more than two,
wherein the transmit antennas are arranged such that their phase centers lie on a first straight line,
wherein the receive antennas are arranged such that their phase centers lie on a second straight line,
wherein the transmit antenna array and the receive antenna array are positioned relative to each other such that the first straight line and the second straight line intersect and extend in a non-zero, non-parallel angle relative to each other,
wherein all of the transmit antennas are on a first side of a center line of a virtual array of the radar device,
wherein all of the receive antennas are on a second side of t center line of the virtual array of the of the radar device, and
wherein the center line of the virtual array bisects the non-zero, non-parallel angle.

18. The radar system according to claim 17, wherein each said transmit antenna of the transmit antenna array and/or each said receive antenna of the receive antenna array comprises a plurality of antenna elements arranged such that the phase centers of each of the plurality of antenna elements lies on the first straight line and the second straight line, respectively.

19. The radar system according to claim 17, wherein
wherein no two pairs of the transmit antennas are a same distance apart along the first straight line, and/or
wherein no two pairs of the receive antennas are a same distance apart along the first straight line.

20. The radar system according to claim 17, further comprising a dummy antenna at an intersection of the first straight line and the second straight line.

* * * * *